Oct. 14, 1958
C. H. WELSTEAD
2,855,684
MICROMETER SCALE
Filed Oct. 1, 1956
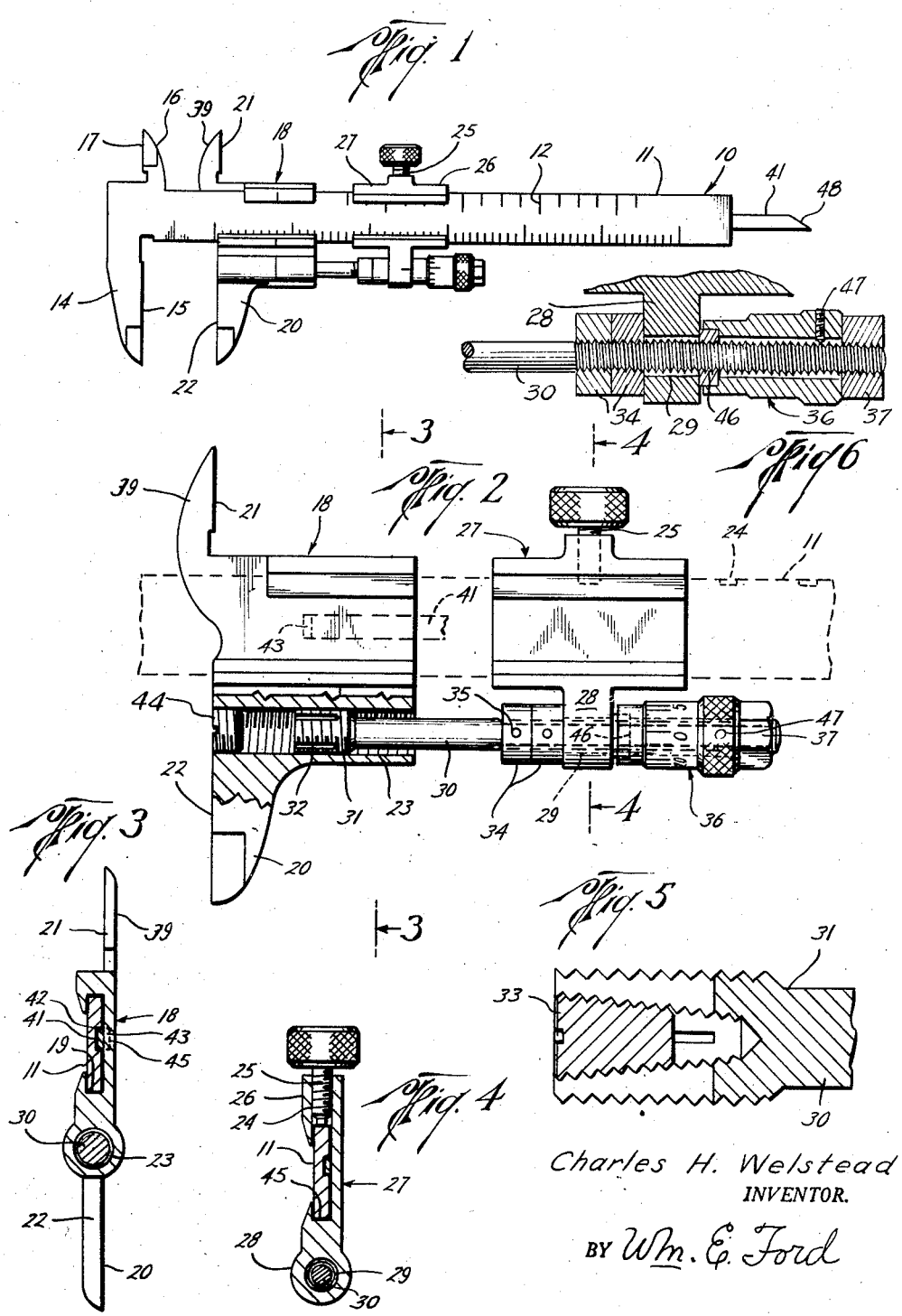
Charles H. Welstead
INVENTOR.
BY Wm. E. Ford
ATTORNEY

United States Patent Office 2,855,684
Patented Oct. 14, 1958

2,855,684

MICROMETER SCALE

Charles H. Welstead, Houston, Tex.

Application October 1, 1956, Serial No. 613,169

9 Claims. (Cl. 33—143)

This invention relates to an improved micrometer scale or gage and in particular to such a scale which has no exposed threads in effecting jaw movement; which has an easily accessible and easily readable micrometer, and which has the micrometer nut located for easy adjustment.

It is therefore a primary object of this invention to provide a micrometer scale in which the micrometer is easily accessible for calibration adjustment, including easy access to micrometer adjustment nut.

It is also an object of this invention to provide such a micrometer scale in which the clamp which connects the micrometer jaw and micrometer for movement can be accurately positioned at predetermined beam graduation.

It is another object of this invention to provide a micrometer scale of this class which may be used as a depth gage.

Other and further objects will be apparent when the specification herein is considered in connection with the drawings in which:

Fig. 1 is an elevation of a micrometer scale showing an embodiment of the invention;

Fig. 2 is an enlarged elevation, part in section, showing the details of micrometer jaw, clamp, and micrometer nut and screw;

Fig. 3 is a transverse sectional view taken along line 3—3 of Fig. 2;

Fig. 4 is a transverse sectional view taken along line 4—4 of Fig. 2;

Fig. 5 is a sectional view taken through the movable jaw end of the micrometer screw; and Fig. 6 is a sectional view taken through the fixed jaw end of the micrometer screw.

As shown in the drawings a micrometer scale 10 includes a beam 11 which has equally spaced apart graduations 12 thereon and which has at one end a fixed jaw 14 which provides a reference plane 15 which extends substantially perpendicular to the longitudinal axis of the beam and which faces toward the remote end of the beam. It also has a fixed jaw 16 which provides a reference surface 17 which extends substantially perpendicular to the longitudinal axis of the beam and which faces outwardly toward the adjacent beam end.

A movable jaw support means 18 is provided which has recesses 19 therein of rectangular cross-section to slide upon the rectangular cross-sectioned beam 11; such clamp providing jaws 39 and 20 having faces 21 and 22 respectively extending perpendicular to the longitudinal axis of the beam 11. The face 21 faces oppositely of the face 17 and the face 22 faces the face 15. Such clamp has a threaded opening 23 therein which extends parallel to the longitudinal axis of the beam and which has a short plug screw 44 in the outer end thereof to keep dirt and deposit from the threads within the opening.

The beam 11 has equally spaced apart holes 24 in the upper face thereof to receive therein the end of a screw 25 which extends through the upper part 26 of the clamp 27, such clamp having a recess 45 therein of rectangular cross-section so that it may slide upon the beam 11. The clamp 27 has a yoke 28 as a lower part thereof which yoke has a smooth bore opening 29 therein for a purpose to be hereinbelow described.

The screw 30 is provided with an end 31 which is internally tapped and slotted at 32 and receives therein the adjustment screw 33 which may be set upon or tightened during use to keep the threads of the element 31 in firm engagement with the threads in the opening 23.

The screw 30 extends with clearance through the smooth bore opening 29 in the yoke 28 and such screw 30 is threaded from its right end as viewed in Fig. 2 to a point past the yoke 28 so that two nuts 34 may be installed on the jaw side of the yoke 28 and tightened to prevent axial movement of the screw, small set screws 35 being provided for this purpose to extend through openings in the nuts 34 to bear against the screw 30 to fix the nuts 34 in locked position.

A micrometer nut 36 is provided with a bore therethrough and a counterbore in the inner end thereof so that it may be slipped over the end of the screw 30 to bear around the smooth periphery of a spacer nut 46 which nut is threaded internally to be threaded onto the screw 30 so that the inner face of the spacer nut 46 bears against the yoke 28, as shown in Fig. 2. This micrometer nut 36 is graduated, as for instance twenty-five graduations around the periphery thereof which would correspond to .025" of travel or the distance between one graduation on the beam scale.

A nut 37 is threaded on the outer end of the micrometer screw 30 to hold the micrometer nut 36 in axially locked adjustment with relation to the screw 30, while a set screw 47 in the micrometer nut 36 holds it on the screw 30 and fixed thereon against rotation with relation thereto whereby the screw 30 may be rotated by rotation of the micrometer nut 36. The micrometer nut 36 is thus adjustably positioned peripherally with relation to the screw 30 and axially from the face of the yoke 28, as spaced therefrom by the nut 47.

It can be seen that adjustment of this type may be made with facility. The nut 37 may be loosened and the micrometer nut 36 rotated to position the zero graduation thereon at the yoke tick mark when the tick mark on the movable jaw 18 is in coincidence with a graduation on the beam 11.

Since the micrometer nut 36 is on the opposite side of the yoke 28 from the jaw 18 it is easily accessible to turn, and it is also in such position that the graduations thereon may be read with ease. As a matter of fact the availability of space in this kind of arrangement makes it possible to provide a micrometer of substantial size which may be easily readable and in proper position to the right of the yoke tick mark.

Also, since the threaded part of the screw 30 is within the threaded opening 23 in case of the end 31, or within the nuts 34, no threads are exposed in position to become fouled with extraneous accumulation, as dirt. Additionally since the insert screw 33 may be tightened to compensate for wear on the threads 31.

As an additional feature of inventive improvement the clamp 27 may be located at accurately spaced apart graduations by virtue of the fact that the spaced holes 24 are provided at such accurately measured distances apart, and in this manner rapid shift may be made from one initial point of reference measurement to another so that thereafter refinement of measurement may be accurately arrived at by micrometer rotation.

The operation of the gage is obvious, the jaw surfaces 17 and 21 being placed in contact with inside dimensions to be measured and the tick mark of the movable jaw 18 read to the nearest beam graduation and the micrometer reading added thereto corresponding with the graduation thereon which is opposite the yoke tick mark. In the case of measuring outside dimensions the jaw surfaces 15, 22 are placed in contact with the outside surfaces of an article to be measured and the movable jaw tick mark read as adjacent a graduation on the beam and the micrometer reading is then added thereto corresponding with the micrometer reading nearest the yoke tick mark.

As an additional feature a depth gage 41 is provided which is of cross-section to fit into a slot 42 in the beam 11 and which has a tongue 43 at one end thereof to fit into a milled slot 45 in the movable jaw member 18. The depth gage is of such length with relation to the beam that the distance from the end of the beam adjacent the depth gage point 48 corresponds to the distance from zero graduation to the point on the beam opposite the movable jaw tick mark.

As the depth gage is connected to the movable jaw member 18 it moves therewith upon micrometer rotation. Thus measurement of a depth may be taken by letting the end of the beam adjacent the gage point 48 bear upon the top of an article the depth of which is to be measured and rotating the micrometer 36 until the advance of the jaw member 18 brings the point 48 into end contact with the bottom of the article to be measured.

Broadly this invention relates to an improved micrometer scale and various embodiments and modifications, other than those shown in the drawings, are considered to be within the broad spirit thereof and within the broad scope of interpretation claimed and merited for the appended claims.

What is claimed is:

1. A micrometer gage including a graduated beam having a fixed jaw thereon providing reference plane surface means at one end thereof extending transversely to the longitudinal axis of said beam, said beam providing openings therein equally spaced apart at measured distances from said reference plane, a clamp including an attachment screw adapted to adjustably position said screw in said openings, a yoke carried by said clamp and providing a smooth bore passage therethrough parallel to the longitudinal axis of said beam, a tick marked movable jaw slidably mounted on said beam and providing a surface to extend parallel to said reference surface and providing a threaded opening therethrough extending parallel to the longitudinal axis of said beam, a micrometer screw extending with clearance through said yoke passage and having an unthreaded portion between said yoke and said movable jaw and a threaded end engageable with the threads within said threaded opening, a graduated micrometer nut mounted coaxially upon said micrometer screw on the opposite side of said yoke from said movable jaw and having a counterbore in the inner end thereof, a spacer nut threadable on said micrometer screw with smooth outer periphery receivable in said counterbore said spacer nut being of longer axial length than said counterbore and spacing said micrometer nut from said yoke when the outer face of said spacer nut is in shouldering adjacency in said micrometer nut and the inner face of said spacer nut bears in rotatable adjacency to said yoke, means to lock said micrometer nut to said micrometer screw to maintain said adjacency, means on the opposite side of said yoke from said spacer nut and covering the threaded part of said micrometer screw to the unthreaded part and adapted to lock said micrometer screw against axial displacement with relation to said yoke whereby upon micrometer nut rotation said movable jaw is drawn along said beam as the micrometer screw threads in said movable jaw engage the threads of said movable jaw in rotation, and a tick mark on said yoke whereby said micrometer nut may be rotated to position a graduation adjacent said yoke tick mark in correlation with jaw tick mark location with relation to beam graduation.

2. A micrometer gage as claimed in claim 1 in which the end of said micrometer screw is internally tapped axially and longitudinally slotted, and an adjustment screw in said tapped end to adjust said micrometer screw thread engagement with said movable jaw.

3. A micrometer gage including a graduated beam having a fixed jaw thereon providing reference plane surface means at one end thereof extending transversely to the longitudinal axis of said beam, said beam providing openings therein equally spaced apart at measured distances from said reference plane, a clamp including an attachment screw adapted to adjustably position said screw in said openings, a yoke carried by said clamp and providing a smooth bore passage therethrough parallel to the longitudinal axis of said beam, a tick marked movable jaw slidably mounted on said beam and providing a surface to extend parallel to said reference surface and providing a threaded opening therethrough extending parallel to the longitudinal axis of said beam, a micrometer screw having successively a threaded portion extending with clearance through said yoke passage and on opposite sides thereof, an unthreaded portion between said yoke and said movable jaw, and a threaded end engageable with the threads within said threaded opening, a graduated micrometer nut assembly mounted coaxially about said micrometer screw threaded portion and locked thereto to rotate with said micrometer screw in rotatable contact with said yoke on the opposite side thereof from said jaw, and lock nut means on the jaw side of said yoke substantially covering the threads of said threaded portion on such side, and a tick mark on said yoke whereby said micrometer nut may be rotated to position a graduation adjacent said yoke tick mark in correlation with jaw tick mark location with relation to beam graduation.

4. A micrometer gage including a graduated beam having a fixed jaw thereon providing reference plane surface means at one end thereof extending transversely to the longitudinal axis of said beam, a clamp including an attachment screw adapted to adjustably position said screw on said beam, a yoke carried by said clamp and providing a smooth bore passage therethrough parallel to the longitudinal axis of said beam, a tick marked movable jaw slidably mounted on said beam and providing a surface to extend parallel to said reference surface and providing a threaded opening therethrough extending parallel to the longitudinal axis of said beam, a micrometer screw extending with clearance through said yoke passage and having a threaded end engageable with the threads within said threaded opening, a graduated micrometer nut mounted coaxially upon said micrometer screw on the opposite side of said yoke from said movable jaw and having a counterbore in the inner end thereof, a spacer nut threadable on said micrometer screw with smooth outer periphery receivable in said counterbore, said spacer nut being of longer axial length than said counterbore and spacing said micrometer nut from said yoke when the outer face of said spacer nut is in shouldering adjacency in said micrometer nut and the inner face of said spacer nut bears in rotatable adjacency to said yoke, adjustment means to lock said micrometer nut to said micrometer screw to maintain said adjacency, means on the opposite side of said yoke from said spacer nut to lock said micrometer screw against axial displacement with relation to said yoke whereby upon micrometer nut rotation said movable jaw is drawn along said beam as the micrometer screw threads in said movable jaw engage the threads of said movable jaw in rotation and a tick mark on said yoke whereby said micrometer nut may be rotated to position a graduation adjacent said yoke tick mark in correlation with jaw tick mark location with relation to beam graduation said adjustment means being releasable to allow for rotation of said micrometer nut with relation to said micrometer screw to make corrective adjustments with relation to said tick marks.

5. A micrometer gage as claimed in claim 4 in which the end of said micrometer screw is internally tapped axially and longitudinally slotted, and an adjustment screw is said tapped end to adjust said micrometer screw thread engagement with said movable jaw.

6. A micrometer gage as claimed in claim 4 in which said fixed jaw and said movable jaw provide parallel transverse faces facing the ends of said jaw and aligned with relation to initial beam graduation for taking inside measurements.

7. A micrometer gage as claimed in claim 4 in which said fixed jaw and said movable jaw provide parallel transverse faces facing each other and aligned with relation to initial beam graduation for taking outside measurements.

8. A micrometer gage as claimed in claim 4 in which said fixed jaw and said movable jaw provide parallel transverse faces facing the ends of said jaw and aligned with relation to initial beam graduation for taking inside measurements and in which said fixed jaw and said movable jaw also provide faces in co-planar extension with said first faces and facing each other for taking outside measurements.

9. A micrometer gage as claimed in claim 4 in which the end of said beam opposite said fixed jaw provides a reference plane surface perpendicular to the longitudinal axis of said beam, in which said beam has a longitudinally extending slot therein, and in which a depth gage bar is provided to slide in said beam slot and is connected to said movable jaw whereby the extension of said bar beyond said reference end of said beam is equal to movable jaw plane surface distance from said fixed jaw reference plane.

References Cited in the file of this patent

UNITED STATES PATENTS

| | | |
|---|---|---|
| 438,504 | Stupakoff | Oct. 14, 1890 |
| 571,094 | McIntyre | Nov. 10, 1896 |
| 1,663,217 | Ryan | Mar. 20, 1928 |
| 2,512,042 | Stern | June 20, 1950 |